Nov. 9, 1926.  
E. R. FELLOWS  
1,606,520  
INVOLUTE MEASURING MACHINE  
Filed Oct. 27, 1923  3 Sheets—Sheet 1
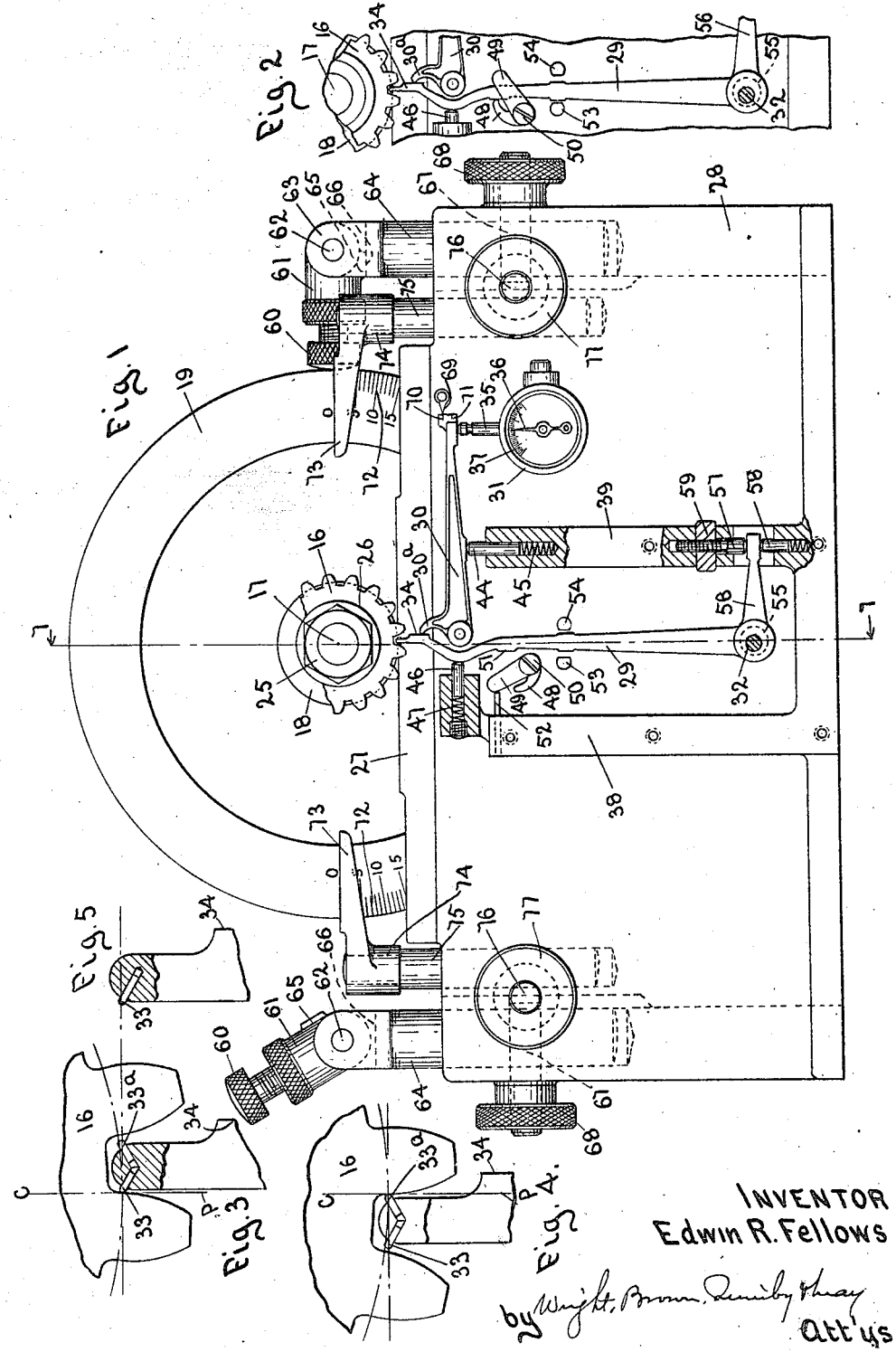
INVENTOR  
Edwin R. Fellows  
Att'ys

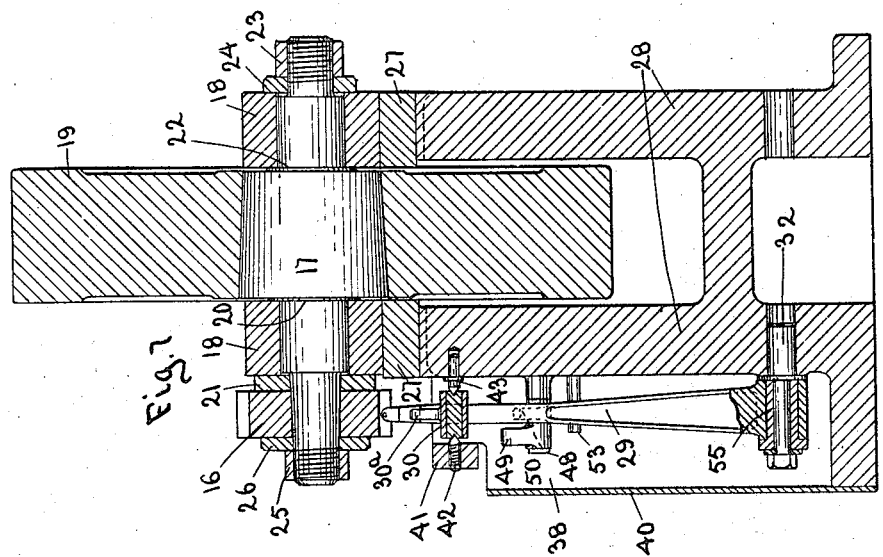
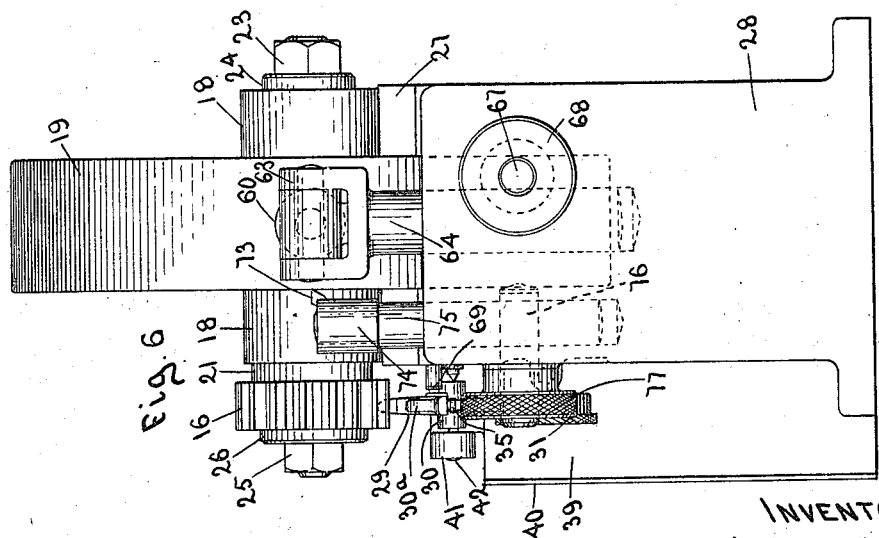

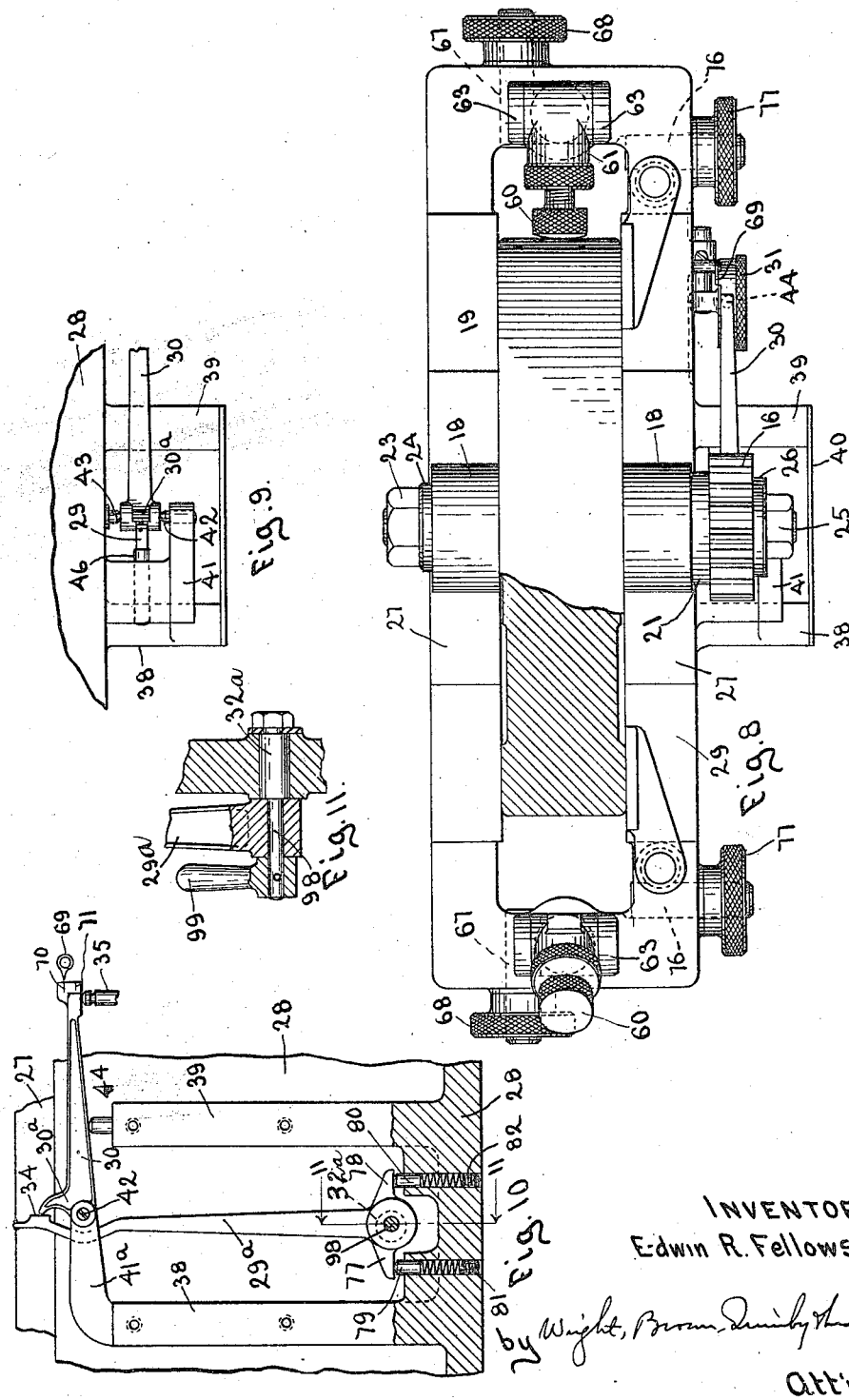

Patented Nov. 9, 1926.

1,606,520

UNITED STATES PATENT OFFICE.

EDWIN R. FELLOWS, OF SPRINGFIELD, VERMONT, ASSIGNOR TO THE FELLOWS GEAR SHAPER COMPANY, OF SPRINGFIELD, VERMONT, A CORPORATION OF VERMONT.

INVOLUTE-MEASURING MACHINE.

Application filed October 27, 1923. Serial No. 671,219.

The present invention relates to measuring or testing apparatus, and particularly to devices for testing the accuracy of, and measuring inaccuracies in, involute curves such as those generated in the gear shaper cutters of the type heretofore devised by me, and in the teeth of gear wheels.

My primary object has been to produce a machine of this character having extreme accuracy and also having provisions for reducing to the minimum the effects of wear and for adjusting to compensate for such wear as does occur.

Another object is to make possible the easy use of the same instrumentalities for testing the curves of the opposite faces of the same gear teeth, without reversing the gear, and for testing gears in different planes.

With these objects in view the invention consists in a means which I have devised for effecting them and in the novel principles of such means, preferred embodiments of which are shown in the accompanying drawings and described in detail in the following specification.

In the drawings,—

Figure 1 is a front elevation, with parts broken away and shown in section, of one form of machine embodying the invention.

Figure 2 is a fragmentary front elevation showing what may be called the "feeler" element of the machine arranged and applied for testing the opposite side of a tooth from that which it tests in Figure 1.

Figures 3 and 4 are detail views on an enlarged scale showing the feeler equipped with wear-resisting contact points, in positions of testing the opposite faces of a gear tooth.

Figure 5 is a detail view of a modified form of feeler having a single wear-resisting contact point.

Figure 6 is an end elevation of the machine as seen from the right of Figure 1.

Figure 7 is a cross section taken on line 7—7 of Figure 1.

Figure 8 is a plan view of the machine showing the rolling weight or balance disk partly broken away.

Figure 9 is a fragmentary plan view of the multiplying mechanism which is a part of the machine.

Figure 10 is a fragmentary view, part elevation and part section, of a modified form of the invention in which the feeler member is spring-balanced in neutral position.

Figure 11 is a detail sectional view taken on line 11—11 of Figure 10.

Like reference characters designate the same parts wherever they occur in all the figures.

For convenience of description I will assume that the machine here shown and embodying the invention is designed for testing the involute curves of spur gear wheels and pinions; at the same time explaining that this assumption is not to be construed as in any sense a limitation of the uses to which the invention may be put or of the scope of the appended claims.

The principle on which the machine operates is that of rolling a gear wheel on the base circle of its involute tooth curves over a plane surface, past a point which is stationary relatively to the gear but may be moved in the directions of displacement of the gear axis. Then the relation which the relatively stationary point bears to the base circle of the rolling gear, is the same as that of a point on a string being wound up on, or unwound from, said base circle. The relative movement between said stationary point and said base circle is an involute curve, and if the point referred to is placed in contact with the face of a tooth before the rolling movement commences, and such face is a perfect involute curve, then there will be no absolute displacement of the point while it remains in contact with the tooth face, but if said face is not true and accurate, an absolute movement of the contact point will take place, and the extent and direction of such movement is the measure of the inaccuracy of the tooth.

In Figures 1 to 8 a gear to be measured is designated by the numeral 16. It is mounted on an arbor 17 to which are secured cylindrical rolls 18, 18 and a weight or balance disk 19. Said rolls are removably applied to the arbor so that different rolls may be used according to the diameter of the gear being tested, the rolls being as nearly as possible equal in diameter to the base circle of the gear. When placed on the arbor the rolls of the indicator and to the pointer, for a purpose presently to be described.

The frame is provided with two forwardly projecting wings 38 and 39 between which the feeler arm and its pivot are located, and across which is placed a protecting cover plate 40. A bracket 41 detachably fastened to the wing 38 supports a cone-pointed screw 42 which forms one of the pivot bearings for the multiplying lever 30, the other pivot bearing of which is provided by a cone-pointed stud 43 set into the main body of the frame. By means of the cone pointed pivots, all looseness of the multiplying lever on its pivot axis may be easily taken up, and one important cause of inaccuracy thus removed. The weight of the multiplying lever is supported by a plunger 44 set into a socket in the top of the wing 39 and supported by a spring 45. A similar plunger 46 set into a transverse passage in the wing 38 and pressed upon by a spring 47 bears on the feeler arm 29 and maintains a light pressure between the latter and the short arm of the multiplying lever. The total effect of these springs, plus that of the spring with which the indicator is equipped, and which tends to raise the plunger 35 in a well known manner, is such as to exert a light pressure tending to move the feeler arm to the left with reference to these drawings, and thus to cause the left hand contact point to bear lightly on the right hand face of the gear tooth.

The same machine may be used for testing the opposite side of the gear tooth, without reversing the gear on the arbor, and in order that it may be so used I have provided a means for applying yielding force to the feeler arm in the opposite direction, more than counterbalancing the resultant effect of the springs just mentioned. This means comprises a finger 48 coupled to a weight 49 and pivoted by a screw 50 which is set into the base. This finger is in the same plane with the feeler arm and is adapted to bear on a surface 51 thereof, while the weight is in front of the arm. When the machine is arranged to test the right hand side of the gear teeth, this weight and arm are thrown into an inoperative position wherein the weight rests against a stop 52, as shown in Figure 1, but when testing the left hand side of the gear teeth, the finger is thrown over to the position shown in Figure 2, wherein it bears against the surface 51 and the weight exerts force in the required direction and of the required intensity to cause the right hand contact point to bear on the left hand side of the gear tooth.

Stop pins 53 and 54 are mounted at opposite sides of the feeler arm to limit the swing of the latter in either direction, but with wider limits than the permissible error of the gear teeth.

One very important feature of the invention comprises a means for adjusting the position of the contact point to compensate for wear and to keep its central point of tangent contact with the gear tooth exactly in the rolling plane. The embodiment of such means here shown comprises an eccentric sleeve or bushing 55 which is the pivot for the feeler arm and is mounted rotatably on the stud 32 previously mentioned and on which the feeler arm has its rotative bearing. To this eccentric sleeve is suitably made fast an adjusting arm 56 which projects between the opposed ends of an adjusting plunger 57 and an oppositely acting spring-pressed take-up plunger 58 mounted in the wing 39 as shown in Figure 1. The adjusting plunger 57 is screw-threaded and is meshed with an adjusting nut 59 seated in a slot in the wing 39. As the sleeve 55 is arranged with the common diameter of its eccentric inner and outer surfaces approximately at right angles to the length of the feeler arm, rotary movement imparted to the sleeve by the adjusting means just described has the effect of raising or lowering the contact point; and the amount of movement thus given to the contact point may be very finely and accurately determined.

A stop for limiting the travel in one direction of the rolling unit is provided, preferably in the form of a screw 60 which is threaded into a block 61. The block 61 is pivoted by a pin 62 between ears 63 on the upper end of a post 64 which fits an upright socket in the base of the machine, with provision for vertical adjustment. By virtue of its pivotal mounting, the stop may be placed in a substantially horizontal position, projecting toward the balance disk 19, as shown at the right of Figures 1 and 8, or may be swung up out of the way of the disk, as shown in the left hand part of said figures. It is arrested in the horizontal position by a shoulder 65 on the side of the block 61 bearing on the surface 66 of the post between the ears thereon. In that position the stop is adapted to arrest the rolling unit by contacting with the circumference of the disk. The vertical adjustment of this post enables the stop to be placed at the same height as the axis of the rolling unit when larger or smaller rollers are applied thereto; while the adjustment of the stop lengthwise in the block 61 enables it to be set so as to locate the rolling unit exactly in the described position prior to the testing of any gear. A screw-threaded clamping pin 67 carrying a nut 68 is provided to secure the stop in its different vertical adjustments. This clamping pin lies in a passage in the base which intersects one side of the socket in which the post 64 is received, and the pin is recessed so as partially to embrace said post.

The same stop device may be used at either end of the machine in the testing, respectively, of the right hand or the left hand side of the gear teeth, by transfer into a socket at one end of the other, but preferably duplicate devices are provided permanently at each end, as shown in these drawings. The one at the right hand side is used when testing the right hand faces of the gear teeth, the other being turned aside; and vice versa when the left hand tooth faces are tested.

In using the machine as thus far described to test the right hand faces of gear teeth, the gear to be tested is placed loosely on the arbor, preferably when the rolling unit is displaced far enough to the left so that the gear will be clear of the feeler arm. Then the rolling unit is rolled to the right into approximately the position shown in Figure 1, where it is arrested by the stop 60. At this time the contact point should be out of contact with the gear. The gear is slowly turned on the arbor by hand until the right hand side of a tooth bears on the contact point and the feeler arm is displaced slightly from the left hand stop 53.

To determine the proper setting of the gear and to apply the desired yielding pressure between the feeler contact point and the tooth, the gear is turned until its point of contact with the feeler is in a given location which may be termed the contact plane. The position of this plane is shown by the broken line C—P in Figures 3 and 4. A fixed index 69 on the base shows with respect to a graduation 70 on the long arm of the multiplying lever 30 when the left hand contact point 33 is in this plane; and with respect to a second graduation 71 on the same arm shows when the right hand contact point 33$^a$ is in the same plane. Preferably, in the interest of the greatest possible accuracy, this contact plane is the plane which passes through the axis of the feeler perpendicular to the rolling plane.

Meanwhile, the stop 60 is adjusted, as to both height and lateral projection, to arrest the rolling unit in such a position that the root end or inner limit of the involute tooth curve is in the said contact plane. This limit of the involute curve is generally the junction point of the tooth face with the fillet at the root of the tooth, which almost always is outside of the base circle. In the extreme case it is in the base circle. Such adjustment of the stop must be made for testing each gear of a different size, and it is made at the point from which movement of the rolling unit further to the right will cause a pronounced and increasing movement of the pointer. The stop adjustment remains the same while all teeth of the same gear are tested, and ensures starting of the inspection at the same point on each tooth.

Before each fresh tooth is tested the gear is turned on the arbor to bring the tooth face to the contact plane, as previously described; and the dial of the indicator is turned to bring its zero to the pointer, because the multiplication is so great that it is not feasible to turn the gear by hand with such nicety of adjustment as will bring the pointer exactly to the zero of the scale. Then the gear is clamped on the arbor by the tightening nut 25.

In testing or inspecting the right hand faces of the gear teeth, the entire rolling unit is rolled to the left. If the tooth face is a perfect involute, there will be no displacement of the feeler contact point; but if the curve is not a true involute its departures from truth will cause or permit displacement of the contact point, which will be detected by multiplied movement of the pointer. The direction and amount of the pointer movement is the measure of the amount and direction of the errors in the tooth.

In order to inspect the opposite or left hand faces of the gear teeth, the left hand stop device is thrown into, and the right hand stop device thrown out of, operative position, the weighted finger is placed in the position shown in Figure 2 so as to exert a pressure on the feeler arm toward the right, the rolling unit is rolled to the left into contact with the stop, the gear is turned on the arbor until the left hand face is in the contact plane, as shown by registry of graduation 71 with index 69, the stop is adjusted according to the same principles as just described, and the gear tooth faces are inspected by rolling the rolling unit to the right.

It is sometimes desired to plot the errors of tooth curves and in order to do this accurately it is necessary to provide a means which will designate the parts of the tooth curve at which the indications to be recorded on the plot are read. To provide such a means I have applied a scale and graduations 72 to a face of the balance weight and have mounted an index 73 on the frame so as to cooperate with such scale. By placing selected marks of the scale beside the index before taking readings of the indicator, definite points are established with reference to which the observed readings may be plotted and the curves of different teeth may be compared. By placing the graduations on the weight at each side of the center thereof, the same sort of measurements may be taken, and plotted, of the curves of both sides of the teeth.

The preferred form of index which I use for this purpose is formed substantially as a blade or finger projecting from a hub 74 applied to a post 75, the latter being set into a passage in the base and secured by a clamp pin 76, similar to the pin 67, on which is mounted a clamp-nut 77. A reversed similar index is provided at the opposite end of the machine for use when plotting the left hand face curves.

A balanced form of feeler arm is shown in Figures 10 and 11. This arm, designated 29ª, is similar to the arm shown in Figures 1 and 3, having two contact points, and in addition it has two oppositely projecting lugs 77 and 78 which are acted on by spring-pressed plungers 79 and 80, respectively. The springs of these plungers are backed up by adjustable abutment screws 81, 82 adapted to be so set that the springs will normally hold the feeler in neutral mid position, and will press either contact point against that tooth face which is in the contact plane, with whatever degree of force is desired. This feeler arm is also adjustable to bring its contact points into the rolling plane by means substantially like the adjusting means already described. In this case a stud 32ª is rotatably mounted in the frame and is provided with an eccentric pivot portion 98 on which the feeler arm is pivoted and to which the adjusting arm 99 is secured. This feeler may be used in the machine shown in the preceding figures in substitution for the feeler 27, spring-pressed plunger 46 and weighted finger 48; with or without substitution of its specifically different means for adjusting the contact point into the rolling plane.

The gear testing apparatus, in the manifestations herein described and in other equivalent forms thereof, combines the quality of indicating with great accuracy in multiplied form the minute errors of gear tooth curves, with provisions for diminishing wear on the contact part of the feeler, provisions for adjusting the feeler to compensate for any such wear as may occur, and provisions for establishing a definite starting point for the rolling movement which is the same for each tooth of the gear being tested. The provision of a long feeler or contact lever enables the movements of such arm occurring in consequence of tooth errors to occur without sensible deviation from the rolling plane, and thus avoids the possibility of errors of indication being introduced through deviation of such path of movement from the contact plane. Besides this, the reversible character of the measuring mechanism is of great advantage as a time saver in testing both sides of the gear teeth; and, in cases where the gear cannot be reversed on the arbor, it permits testing of curves which otherwise could not be tested at all.

What I claim and desire to secure by Letters Patent is:

1. A machine for testing the accuracy of involute curves comprising a rolling unit by which the member having the involute curve is carried, and provided with a supporting surface conforming to the base circle of said involute curve, a base having a plane surface on which said supporting surface is adapted to roll, a feeler member having a contact point arranged to make contact with the involute curve in the plane of said plane surface, and means for effecting such adjustment between the feeler and said plane surface as to bring the point of contact of said feeler with the involute curve accurately into said plane.

2. A machine of the character described as set forth in claim 1 in which the means for adjusting said feeler comprises a pivoted eccentric on which the feeler has a pivotal bearing, and means for adjusting said eccentric rotatably about its pivotal support.

3. A machine of the character described as set forth in claim 1, in which the adjusting means for the feeler comprises a pivot member on which the feeler is mounted for swinging movement, which member is itself adjustable in suitable directions to place its axis at different distances from the rolling surface of the base.

4. A machine of the character described as set forth in claim 1 in which the support for the feeler comprises a sleeve having eccentric inner and outer surfaces the axes of which are substantially parallel to one another, and a fixed pivot on which said sleeve is mounted rotatably, the outer surface of the sleeve being surrounded by the hub of said feeler.

5. In a machine of the character described having a rolling unit and a plane surface on which said unit rolls, a feeler arm adapted to make contact with a member having an involute curved surface and carried by said rolling unit, a pivot on which said feeler is adapted to turn, and a mounting for said pivot eccentric to that part of the pivot which is engaged by the feeler and with respect to which mounting the pivot is rotatable.

6. In a machine as set forth in claim 5 means for rotating said pivot comprising an arm secured thereto and projecting therefrom.

7. In a machine as set forth in claim 5 means for rotating said pivot comprising an arm secured thereto and projecting therefrom and an adjusting screw bearing on said arm.

8. A machine for testing the accuracy of involute gear tooth surfaces comprising a feeler having an end arranged and adapted to enter the space between two gear teeth and super-hard contact pieces set into opposite sides of the end of said feeler with their extremities distant from one another less than the width of such tooth space, and each arranged so that it may be brought into contact with the adjacent side of a tooth.

9. A machine for measuring involute gears comprising a rolling unit, a support having a plane surface on which said unit rolls, a feeler adapted to engage an involute surface of a number carried by the rolling unit and being shiftable in the directions of travel of said unit, and a stop arranged to arrest the rolling movement of said unit in one direction.

10. A machine for testing the accuracy of involute gear tooth curves comprising a base having a supporting plane surface, a rolling unit adapted to roll on said plane surface and including an arbor whereon the gear to be tested may be mounted and rotatably adjusted, a feeler arranged to bear on the side of a tooth of a gear mounted on said arbor and being displaceable in the directions of traverse of the rolling unit, and a stop mounted on the base in position to engage a portion of such rolling unit and arrest the same, whereby to establish a fixed limit to its traverse in one direction.

11. A testing machine as set forth in claim 10, in which the stop is adjustable in directions parallel to the plane of the aforesaid supporting surface.

12. A testing machine as set forth in claim 10 in which the stop is adjustable in directions transverse to the plane of the aforesaid supporting surface.

13. A machine as set forth in claim 10, and including a second stop arranged to arrest the rolling movement of said unit in the opposite direction; each stop being constructed to be placed out of operation when the other is operative.

14. A testing machine as set forth in claim 10, in which the stop comprises a post and a screw having a threaded mounting and projecting laterally from said post.

15. A testing machine as set forth in claim 10 in which the stop includes a post, a block pivoted to said post, and a screw threaded into and projecting from said post; the block being movable into a position where the screw projects toward the rim of the rolling unit in the path thereof, and also into a position where the screw is clear of the unit.

16. A testing machine as set forth in claim 10, in which the stop comprises a post set in the base with provision for vertical adjustment, beyond one of the limits of movement of the rolling unit, a block pivoted to said post and adapted to be placed where it projects toward the rolling unit or where it projects away therefrom, and a screw threaded into said block and projecting from the end thereof.

17. A machine for testing the accuracy of involute gear tooth curves comprising a rolling unit adapted to carry the gear to be tested, a feeler adapted to bear on the involute face of a tooth of such gear, and means for establishing a definite point from which to start the rolling unit when testing each of the teeth of such gear.

18. In a machine for testing the accuracy of involute gear tooth curves, a rolling unit adapted to carry a gear to be tested and including a substantially circular disk there being a graduated scale on a surface of said disk and a relatively stationary index arranged to cooperate with said scale in establishing definite positions of the said rolling unit.

19. A machine for testing the accuracy of involute gear tooth curves comprising a rolling unit of which the gear to be tested is adapted to form a part, a supporting surface on which said unit rolls, a feeler finger pivoted below said surface and extending toward the same adapted to enter the space between two of the teeth of the gear and having contact points adapted to engage one or the other of said teeth, yielding means normally acting to press said feeler toward one of the teeth, and means adapted to apply a yielding force to said feeler finger of sufficient value to overcome said yielding means.

20. In a machine for testing the accuracy of involute gear tooth curves, a rolling unit adapted to include a gear to be tested, a yieldingly mounted feeler member extending between two of the teeth of such gear and having contact points adapted to engage the adjacent side of one or the other of the said teeth, a constantly acting force-applying means tending to hold the feeler against one of said teeth, and a displaceable force-applying means adapted to be placed in different positions, in one of which it applies force to the feeler member opposite to the before-mentioned force-applying means and with intensity sufficient to overcome the latter means, and in the other of which positions it is clear of the feeler member.

21. A testing machine as set forth in claim 20 in which the last-mentioned force-applying means is a pivotally mounted combined finger and weight adapted to be placed in a position where its finger bears against the side of the feeler member, and in another position where the finger is clear of said member, the weight being associated with the finger in such relation that, when the finger bears against the feeler member as above set forth, the weight exerts through the finger a yielding force upon the feeler member.

22. In a gear tooth testing machine, a rolling unit adapted to include the gear to be tested, and a feeler member adapted to enter the space between two teeth of such gear and to engage either face bounding such space, said feeler member being yieldingly held in neutral position and adapted to exert yielding pressure against the gear tooth at either side when either of such teeth is brought into contact with it.

23. In a machine for testing involute gear tooth curves, a base having a plane supporting surface, a rolling unit adapted to include the gear to be tested arranged to roll on said surface, and testing mechanism comprising a counter-balanced feeler finger extending into the space between two gear teeth and adapted to engage the involute face of either tooth, said feeler being under stress yieldingly resisting its displacement in either direction, and a multiplying indicator lever engaged with said feeler and movable in consequence of displacement in either direction of the feeler.

24. In a machine for testing involute gear tooth curves, a base having a plane supporting surface, a rolling unit adapted to include the gear to be tested arranged to roll on said surface, and testing mechanism comprising a counter-balanced feeler finger extending into the space between two gear teeth and adapted to engage the involute face of either tooth, said feeler being under stress yieldingly resisting its displacement in either direction, adjusting means for regulating the stress acting on said feeler, and a multiplying indicator lever engaged with said feeler and movable in consequence of displacement in either direction of the feeler.

25. A machine for testing involute gear tooth curves comprising a support having a plane top surface, a rolling unit adapted to roll on said surface and adapted to include the gear to be tested, a long feeler lever pivoted below said surface and extending from its pivot into the space between two teeth of said gear, said lever having opposite contact points in the plane of said surface adapted to bear respectively on one or the other of said teeth; yielding force-applying means acting oppositely on said lever and holding the same in the balanced position and resisting movement to either side of such position, a multiplying indicator lever engaged with said feeler lever and movable by displacements of the latter, and an eccentrically rotatable pivot for said lever arranged to adjust, in consequence of its rotation, the height of said contact points.

26. In a machine for testing involute curved surfaces, a rolling unit adapted to carry the article having the curved surface in a manner permitting rotary adjustment of such article about the center of the base circle of said involute surface, a base having a plane surface, and said rolling unit having a curved surface coaxial and of equal radius with said base circle, adapted to roll on said plane surface, a feeler arranged to engage said involute surface and mounted with provision for displacement in a path tangent to the base circle, means for indicating on an enlarged scale the displacement of said feeler, and a separate index cooperative with said feeler under the movement imparted thereto by rotary adjustment of the said article for showing when the point of contact between the feeler and involute surface is in a prescribed plane transverse to the before mentioned plane surface of the base.

In testimony whereof I have affixed my signature.

EDWIN R. FELLOWS.

Nov. 9, 1926.
G. FLINTERMANN
1,606,521
BEARING
Filed Nov. 11, 1925   2 Sheets-Sheet 1
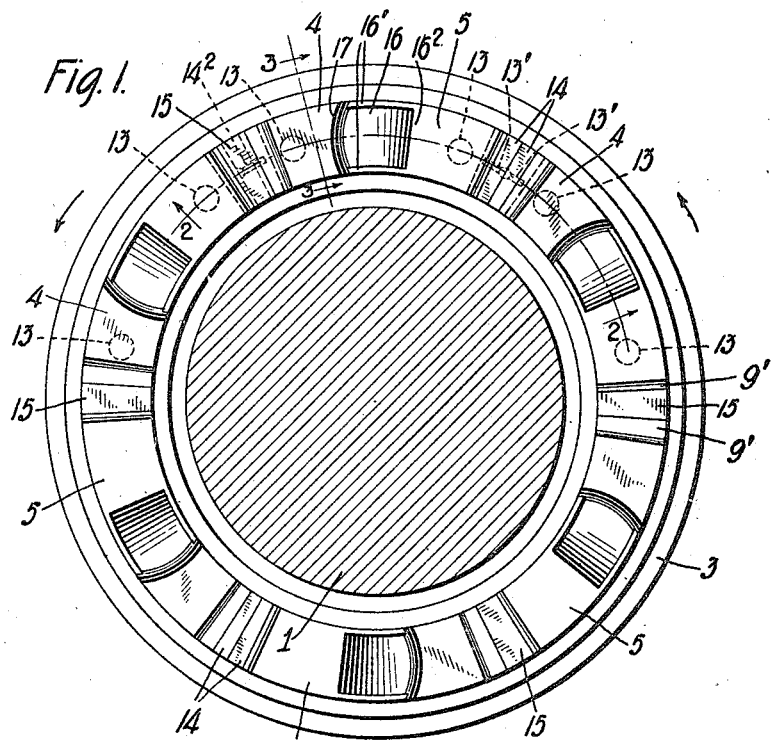
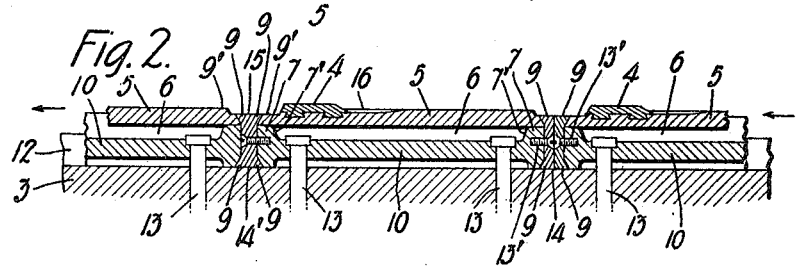
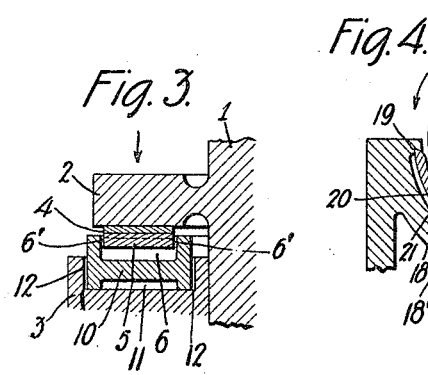
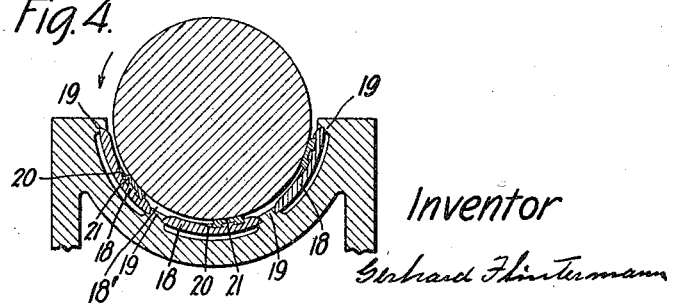
Inventor
Gerhard Flintermann